United States Patent
Morooka et al.

(10) Patent No.: US 10,614,834 B2
(45) Date of Patent: Apr. 7, 2020

(54) MAGNETIC TAPE

(71) Applicant: FUJIFILM Corporation, Tokyo (JP)

(72) Inventors: Atsushi Morooka, Minami-ashigara (JP); Toshio Tada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 206 days.

(21) Appl. No.: 15/716,622

(22) Filed: Sep. 27, 2017

(65) Prior Publication Data
US 2018/0096700 A1 Apr. 5, 2018

(30) Foreign Application Priority Data

Sep. 30, 2016 (JP) ................................. 2016-193704
Jul. 19, 2017 (JP) ................................. 2017-140033

(51) Int. Cl.
*G11B 5/008* (2006.01)
*G11B 5/706* (2006.01)
*G11B 5/70* (2006.01)
*G11B 5/78* (2006.01)

(52) U.S. Cl.
CPC ............ *G11B 5/00813* (2013.01); *G11B 5/70* (2013.01); *G11B 5/70678* (2013.01); *G11B 5/78* (2013.01)

(58) Field of Classification Search
CPC ......... G11B 5/00813; G11B 5/70; G11B 5/78; G11B 5/70678
See application file for complete search history.

(56) References Cited

U.S. PATENT DOCUMENTS

| 2005/0089722 A1* | 4/2005 | Masaki ................... G11B 5/70 428/842.8 |
| 2006/0098342 A1* | 5/2006 | Matsumoto ........ G11B 23/0308 360/133 |

FOREIGN PATENT DOCUMENTS

| JP | H4-129024 A | 4/1992 |
| JP | 11-31320 A | 2/1999 |
| JP | 2011-181116 A | 9/2011 |

OTHER PUBLICATIONS

Office Action dated May 21, 2019 issued by the Japanese Patent Office in counterpart Japanese application No. 2017-140033.

* cited by examiner

*Primary Examiner* — Holly C Rickman
(74) *Attorney, Agent, or Firm* — Sughrue Mion, PLLC

(57) ABSTRACT

Provided is a magnetic tape in which a vertical direction squareness ratio and/or a longitudinal direction squareness ratio obtained by measurement performed by sweeping an external magnetic field in the magnetic tape in a predetermined range by a vibrating sample magnetometer is 0.70 to 1.00, and A calculated by Expression 1 is equal to or smaller than 5.0%. In Expression 1, n represents the number of measurement points measured at magnetic field strength of −40 kA/m to 40 kA/m during the sweeping and is 52, Mr(Hex) represents a magnetization quantity measured at magnetic field strength Hex, and μ represents an arithmetical mean of Mr(Hex) obtained by measurement performed in the range of the magnetic field strength during the sweeping.

$$A = 100 \times \sqrt{\frac{1}{n-1} \sum_{Hex=-40kA/m \sim 40kA/m} (Mr(Hex) - \mu)^2} \Big/ \mu \quad \text{Expression 1}$$

8 Claims, 2 Drawing Sheets

MAGNETIC TAPE

CROSS-REFERENCE TO RELATED APPLICATIONS

This application claims priority under 35 U.S.C 119 to Japanese Patent Application No. 2016-193704 filed on Sep. 30, 2016 and Japanese Patent Application No. 2017-140033 filed on Jul. 19, 2017. Each of the above applications is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up. In recent years, a technology of data transfer for rapid transfer of information has been significantly developed and transfer of image and data including a large quantity of information can be carried out. With the development of the data transfer technology, higher-density recording of a magnetic tape for recording, storing, and reproducing information has proceeded. Along with this, in order to realize high-sensitivity reproduction of information which is recorded with high density, it is necessary to improve electromagnetic conversion characteristics of a magnetic tape (for example, see JP1999-31320A (JP-H11-31320).

SUMMARY OF THE INVENTION

The recording and/or reproducing of signals to a magnetic tape are normally performed by allowing the magnetic tape to run in a drive and bringing a surface of the magnetic tape (surface of a magnetic layer) to come into contact with a magnetic head to slide thereon. For example, by allowing the magnetic tape to repeatedly run in the drive (hereinafter, also simply referred to as "repeated running"), signals recorded in the magnetic tape can be continuously or intermittently repeatedly reproduced. It is desired that a deterioration of electromagnetic conversion characteristics during such repeated running is prevented, from a viewpoint of increasing reliability of the magnetic tape for data storage use. This is because a magnetic tape, in which electromagnetic conversion characteristics during the repeated running are hardly deteriorated, can continuously exhibit excellent electromagnetic conversion characteristics, even when the running is continuously or intermittently repeated in a drive.

In addition, in order to increase reliability of the magnetic tape for data storage use, it is desired that loss of a part of signals recorded in the magnetic tape is prevented during the storage of the magnetic tape. In order to do that, it is desired that demagnetization during the storage of the magnetic tape is prevented (generally called "improvement of thermal stability").

As described above, in the magnetic tape, it is desired that electromagnetic conversion characteristics are increased, a deterioration of electromagnetic conversion characteristics during repeated running is prevented, and thermal stability is improved. Meanwhile, regarding the improvement of performance of a magnetic recording medium, a technology of adjusting magnetic properties such as a squareness ratio and the like has been proposed in the related art (for example, see JP1999-31320A (JP-H11-31320)).

However, in the field of magnetic recording, realization of high-density recording is desired, in order to deal with an increase in the information content. In regard to this point, it is generally said that ferromagnetic hexagonal ferrite powder is suitable for high-density recording, among various ferromagnetic powders. Therefore, the inventor has studied for a magnetic tape including ferromagnetic hexagonal ferrite powder in a magnetic layer, and it is found that, in a case where magnetic properties are adjusted as proposed in the related art, it is not easy to achieve any of improvement of electromagnetic conversion characteristics, prevention of a deterioration of electromagnetic conversion characteristics during repeated running, and improvement of thermal stability.

Thus, an object of the invention is to provide a magnetic tape including ferromagnetic hexagonal ferrite powder in a magnetic layer, in which excellent electromagnetic conversion characteristics and thermal stability can be exhibited and electromagnetic conversion characteristics during repeated running are hardly deteriorated.

According to one aspect of the invention, there is provided a magnetic tape comprising: a non-magnetic support; and a magnetic layer including ferromagnetic powder and a binding agent on the non-magnetic support, in which the ferromagnetic powder is ferromagnetic hexagonal ferrite powder, at least one squareness ratio of a vertical direction squareness ratio or a longitudinal direction squareness ratio obtained by measurement performed by sweeping an external magnetic field in the magnetic tape at magnetic field strength of −1197 kA/m to 1197 kA/m by a vibrating sample magnetometer is 0.70 to 1.00, and A calculated by Expression 1 is equal to or smaller than 5.0%.

$$A = 100 \times \sqrt{\frac{1}{n-1} \sum_{Hex=-40kA/m \sim 40kA/m} (Mr(Hex) - \mu)^2} \Big/ \mu \quad \text{Expression 1}$$

(In Expression 1, n represents the number of measurement points measured at magnetic field strength of −40 kA/m to 40 kA/m during the sweeping and is 52, Mr(Hex) represents a magnetization quantity measured at magnetic field strength Hex, and μ represents an arithmetical mean of Mr(Hex) obtained by measurement performed at magnetic field strength of −40 kA/m to 40 kA/m during the sweeping.)

In regard to the magnetic field strength, a conversion factor of a unit Oe (oersted) into SI unit A/m is $10^3/4\pi$. A range of −1197 kA/m to 1197 kA/m is identical to a range of −15 kAOe to 15 kOe, and a range of −40 kA/m to 40 kA/m is identical to a range of −500 Oe to 500 Oe. Mr(Hex) and μ use a unit in the same unit system. A unit of the magnetization quantity is A/m or $J(T \cdot m^3)$ in the SI unit system.

In the invention and the specification, the measurement performed by using a vibrating sample magnetometer is performed at a measurement temperature of 24° C.±1° C. The sweeping of the external magnetic field is performed with an average number of 1 in each step by using a tape sample cut out from a magnetic tape which is a measurement target, under sweeping conditions shown in Table 2 which will be described later. By sweeping the external magnetic field as described above, a hysteresis curve (referred to as an "M-H curve") is obtained in a range of −1197 kA/m to 1197 kA/m. Hereinafter, the M-H curve obtained by the measurement performed by disposing a tape sample in a vibrating sample magnetometer so that an application direction of the external magnetic field is orthogonal to a longitudinal direction of the tape sample, is referred to as a "vertical direction M-H curve". The M-H curve obtained by the measurement performed by disposing a tape sample in a vibrating sample magnetometer so that an application direction of the external magnetic field is parallel to a longitudinal direction of the tape sample, is referred to as a "longitudinal direction M-H curve". The longitudinal direction of the tape sample is a longitudinal direction of the magnetic tape from which the tape sample is cut out. The same applies to a width direction regarding the tape sample. A measured value is obtained as a value obtained by subtracting magnetization of a sample probe of a vibrating sample magnetometer meter as background noise. The squareness ratio is a squareness ratio without diamagnetic field correction. As a vibrating sample magnetometer (VSM), a well-known device such as a device used in Examples which will be described later can be used. Regarding the tape sample, saturated magnetization obtained from the M-H curve obtained as described above may be $5 \times 10^{-6}$ to $10 \times 10^{-6}$ A·m$^2$ ($5 \times 10^{-3}$ to $10 \times 10^{-3}$ emu), and a size and a shape thereof are not limited, as long as saturated magnetization of this range is obtained.

In the invention and the specification, a vertical direction squareness ratio is a squareness ratio measured in the vertical direction of the magnetic tape, and a vertical direction is a direction orthogonal to the longitudinal direction of the magnetic tape. A longitudinal direction squareness ratio is a squareness ratio measured in the longitudinal direction of the magnetic tape. The vertical direction squareness ratio is obtained from the vertical direction M-H curve. The longitudinal direction squareness ratio is obtained from the longitudinal direction M-H curve. In the invention and the specification, the description regarding directions and angles (for example, "orthogonal") includes a range of errors allowed in the technical field of the invention. The range of errors means, for example, a range within less than ±10° from an exact angle, and is preferably within ±5° and more preferably within ±3° from an exact angle.

In the invention and the specification, the "ferromagnetic hexagonal ferrite powder" means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles" or simply "particles". The "aggregate" not only includes an aspect in which particles configuring the aggregate directly come into contact with each other, but also includes an aspect in which a binding agent, an additive, or the like is interposed between the particles. The points described above are also applied to various powder such as non-magnetic powder of the invention and the specification, in the same manner.

In one aspect, the A is 1.5% to 5.0%.

In one aspect, the A is 1.5% to 3.9%.

In one aspect, at least one squareness ratio of the vertical direction squareness ratio or the longitudinal direction squareness ratio of the magnetic layer is 0.75 to 1.00.

In one aspect, the magnetic tape further includes a non-magnetic layer, including non-magnetic powder and a binding agent, between the non-magnetic support and the magnetic layer.

In one aspect, the magnetic tape further includes a back coating layer, including non-magnetic powder and a binding agent, on a surface side of the non-magnetic support opposite to a surface side provided with the magnetic layer.

According to one aspect, it is possible to provide a magnetic tape including ferromagnetic hexagonal ferrite powder in a magnetic layer, capable of maintaining excellent electromagnetic conversion characteristics during repeated running, and having excellent thermal stability.

BRIEF DESCRIPTION OF THE DRAWINGS

In FIG. 2, lines were drawn in the transmission electron microscope image of the particle shown in FIG. 1 for explaining a circumscribed circle, a center C of the circumscribed circle, and a polar coordinate ωt.

DESCRIPTION OF THE PREFERRED EMBODIMENTS

Figure 1:
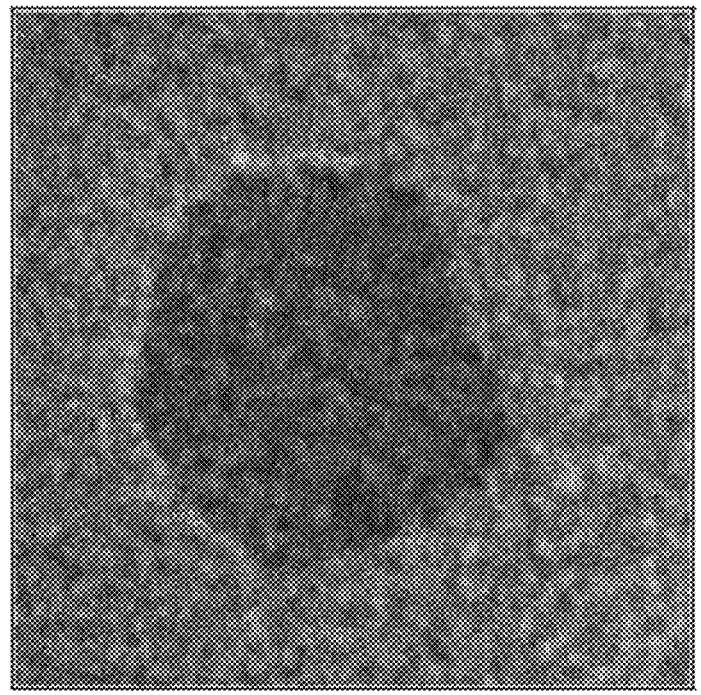
FIG. 1 shows a transmission electron microscope image of a particle included in ferromagnetic hexagonal ferrite powder 1 used in Examples.

In one aspect of the invention, there is provided a magnetic tape including: a non-magnetic support; and a magnetic layer including ferromagnetic powder and a binding agent on the non-magnetic support, in which the ferromagnetic powder is ferromagnetic hexagonal ferrite powder, at least one squareness ratio of a vertical direction squareness ratio or a longitudinal direction squareness ratio obtained by measurement performed by sweeping an external magnetic field in the magnetic tape at magnetic field strength of −1197 kA/m to 1197 kA/m by a vibrating sample magnetometer (hereinafter, also simply referred to as a "squareness ratio") is 0.70 to 1.00, and A calculated by Expression 1 is equal to or smaller than 5.0%.

$$A = 100 \times \sqrt{\frac{1}{n-1} \sum_{Hex=-40kA/m\sim40kA/m} (Mr(Hex) - \mu)^2} \Big/ \mu \quad \text{Expression 1}$$

(In Expression 1, n represents the number of measurement points measured at magnetic field strength of −40 kA/m to 40 kA/m during the sweeping and is 52, Mr(Hex) represents a magnetization quantity measured at magnetic field strength Hex, and μ represents an arithmetical mean of Mr(Hex) obtained by measurement performed at magnetic field strength of −40 kA/m to 40 kA/m during the sweeping.)

The inventors has newly found that it is possible to improve electromagnetic conversion characteristics of the magnetic tape including ferromagnetic hexagonal ferrite powder and the magnetic layer, prevent a deterioration in electromagnetic conversion characteristics during repeated running, and improve thermal stability, by controlling magnetic properties obtained from the hysteresis curves (M-H curves) obtained by sweeping an external magnetic field as described above. The surmise of the inventors regarding the magnetic tape is as follows.

The squareness ratio of the magnetic tape which is 0.70 to 1.00 can mainly contribute to the magnetic tape to exhibit excellent electromagnetic conversion characteristics. The inventors have surmised that the presence of super fine particles described below may prevent output improvement and cause a deterioration of electromagnetic conversion characteristics.

However, the inventors have thought that a squareness ratio is generally a value greatly affected by a shape of the M-H curve at magnetic field strength of 40 kA/m to 1197 kA/m in the M-H curve. With respect to this, the inventors have thought that it is also necessary to control magnetic properties which are affected by a shape of the M-H curve at magnetic field strength smaller than 40 kA/m in the M-H curve, in order to obtain a magnetic tape exhibiting excellent thermal stability, in addition to excellent electromagnetic conversion characteristics and in which electromagnetic conversion characteristics during repeated running is hardly deteriorated. This may be because a component affecting such magnetic properties causes a deterioration of thermal stability and a deterioration of electromagnetic conversion characteristics during repeated running. Specifically, a component affecting the magnetic properties is considered as super fine particles. It is assumed that such super fine particles are, for example, generated by partial chipping of particles of the ferromagnetic hexagonal ferrite powder by a dispersing process in a preparation step of a magnetic layer forming composition. However, such super fine particles cannot be magnetized by an external magnetic field and cannot contribute to the recording. Even in a case where the super fine particles are magnetized, there is a strong tendency of loss of the recorded information due to a so-called thermal fluctuation. The inventors have assumed that the presence of such super fine particles causes a deterioration of thermal stability. In addition, the inventors have thought that, in a case where a percentage of the super fine particles occupying ferromagnetic hexagonal ferrite powder included in the magnetic layer increases, an area of an interface between organic materials such as a binding agent and the like, and particles of ferromagnetic hexagonal ferrite powder assumed to have lower strength than that of the organic materials increases, and thus, strength of the magnetic layer tends to decrease. In a case where the strength of the magnetic layer decreases and the surface of the magnetic layer chips at the time when the surface of the magnetic layer of the magnetic tape and the magnetic head slide on each other during repeated running, foreign materials generated due to chipping are attached to a magnetic head and widen an interval between the surface of the magnetic layer and the magnetic head (spacing). It is thought that, as a result of the output decrease which is a so-called spacing loss, electromagnetic conversion characteristics are deteriorated during repeated running.

In regard to the points described above, during the intensive studies, the inventors have thought that a value of A calculated by Expression 1 described above correlates with the amount of super fine particles present in the magnetic layer, and a small value of A indicates the small amount of super fine particles. In addition, as a result of intensive studies, the inventors have newly found that it is possible to improve thermal stability and/or prevent a deterioration of electromagnetic conversion characteristics during repeated running, by setting A to be equal to or smaller than 5.0%.

However, the invention is not limited to the surmises described above. This specification contains surmise of the inventors such as described above. The invention is not limited to such surmise.

Hereinafter, the magnetic tape will be described more specifically.

Squareness Ratio

In the magnetic tape, at least one squareness ratio of the vertical direction squareness ratio or the longitudinal direction squareness ratio obtained by measurement performed by sweeping an external magnetic field in the magnetic tape at magnetic field strength of −1197 kA/m to 1197 kA/m by a vibrating sample magnetometer is 0.70 to 1.00. At least one squareness ratio of the vertical direction squareness ratio or the longitudinal direction squareness ratio may be 0.70 to 1.00. In one aspect, the vertical direction squareness ratio is 0.70 to 1.00 and the longitudinal direction squareness ratio is smaller than 0.70. In another aspect, the longitudinal direction squareness ratio is 0.70 to 1.00 and the vertical direction squareness ratio is smaller than 0.70. In still another aspect, the vertical direction squareness ratio and the longitudinal direction squareness ratio are 0.70 to 1.00. From a viewpoint of improving electromagnetic conversion characteristics, a high squareness ratio of 0.70 to 1.00 is preferable. From this viewpoint, a squareness ratio of 0.70 to 1.00 is preferably equal to or greater than 0.75, more preferably equal to or greater than 0.80, and even more preferably equal to or greater than 0.85. In principle, the maximum value of the squareness ratio is 1.00. The squareness ratio of 0.70 to 1.00 can be equal to or smaller than 0.98, equal to or smaller than 0.95, or equal to or smaller than 0.93. However, from a viewpoint of improving electromagnetic conversion characteristics, a high squareness ratio is preferable, and therefore, the squareness ratio may be greater than the exemplified upper limits. The squareness ratio can be, for example, controlled under orientation conditions of an orientation process. The orientation conditions include strength of magnet used in the orientation process, a magnetic field applying time, and the like. The vertical direction squareness ratio can be preferably controlled by performing a vertical orientation process and adjusting orientation conditions of the vertical orientation process. The longitudinal direction squareness ratio can be preferably controlled by performing a longitudinal orientation process and adjusting orientation conditions of the performing a longitudinal.

A Calculated by Expression 1

In the magnetic tape, A calculated by Expression 1 by using a measured value obtained by the measurement performed by sweeping an external magnetic field in the magnetic tape at magnetic field strength of −1197 kA/m to 1197 kA/m by a vibrating sample magnetometer is equal to or smaller than 5.0%.

$$A = 100 \times \sqrt{\frac{1}{n-1} \sum_{Hex=-40kA/m \sim 40kA/m} (Mr(Hex) - \mu)^2} \Big/ \mu \qquad \text{Expression 1}$$

In Expression 1, n represents the number of measurement points measured at magnetic field strength of −40 kA/m to 40 kA/m during the sweeping and is 52, Mr(Hex) represents a magnetization quantity measured at magnetic field strength Hex, and $\mu$ represents an arithmetical mean of Mr(Hex) obtained by measurement performed at magnetic field strength of −40 kA/m to 40 kA/m during the sweeping. Regarding the magnetic tape in which the vertical direction squareness ratio and the longitudinal direction squareness ratio are different from each other, the M-H curve used for obtaining A is set as an M-H curve obtained in the direction in which the squareness ratio is great. That is, regarding the magnetic tape in which the vertical direction squareness ratio is greater than the longitudinal direction squareness ratio, A is obtained by using the vertical direction M-H curve. Regarding the magnetic tape in which the longitudinal direction squareness ratio is greater than the vertical direction squareness ratio, A is obtained by using the longitudinal direction M-H curve. Regarding the magnetic tape in which the vertical direction squareness ratio and the longitudinal direction squareness ratio are the same value, A is obtained by using the vertical direction M-H curve.

Regarding A obtained by Expression 1, the inventors have thought that the A is a value which is an index of a variation in magnetization quantity at magnetic field strength of −40 kA/m to 40 kA/m, and a small value indicates a small percentage of the super fine particles described above occupying ferromagnetic hexagonal ferrite powder included in the magnetic layer. With respect to this, the inventors have thought that the squareness ratio is a value greatly affected by the shape of the M-H curve at magnetic field strength of −40 kA/m to 1197 kA/m. Accordingly, the inventors have thought that it is difficult to sufficiently control magnetic properties of the magnetic tape affected by the super fine particles, only by using the squareness ratio. With respect to this, as a result of the intensive studies of the inventors, the inventors have found a technology of controlling the A obtained by Expression 1. The value of the A is preferably small, because it is thought that a percentage of the super fine particles occupying ferromagnetic hexagonal ferrite powder included in the magnetic layer is small. From this viewpoint, the A is preferably equal to or smaller than 4.8%, more preferably equal to or smaller than 4.5%, even more preferably equal to or smaller than 4.2%, still preferably equal to or smaller than 4.0%, still more preferably equal to or smaller than 3.9%, and still even more preferably equal to or smaller than 3.5%. In addition, the A can be, for example, equal to or greater than 1.0%, equal to or greater than 1.5%, equal to or greater than 2.0%, or equal to or greater than 2.5%. However, a small value is preferable, and therefore, the A may be smaller than the lower limit described above. The inventors have thought that the A can be decreased by preventing generation of super fine particles (chipping) in a preparation step of a magnetic layer forming composition. A specific method of preventing the generation of super fine particles (chipping) will be described later.

Ferromagnetic Hexagonal Ferrite Powder

The magnetic layer of the magnetic tape includes ferromagnetic hexagonal ferrite powder. Regarding the ferromagnetic hexagonal ferrite powder, crystal structures of hexagonal ferrite include a magnetoplumbite type (also referred to as an "M type"), a W type, a Y type, and a Z type. The ferromagnetic hexagonal ferrite powder included in the magnetic layer may have any crystal structure. In the crystal structure of hexagonal ferrite, an iron atom and a divalent metal atom are included as constituent atoms. The divalent metal atom is a metal atom which can be a divalent cation as an ion and examples thereof include an alkali earth metal atom such as a barium atom, a strontium atom, or a calcium atom, and a lead atom. For example, a hexagonal ferrite including a barium atom as the divalent metal atom is a barium ferrite, and a hexagonal ferrite including a strontium atom is a strontium ferrite. The hexagonal ferrite may be mixed crystal of two kinds of hexagonal ferrites. As an example of the mixed crystal, mixed crystal of barium ferrite and strontium ferrite is used.

As the ferromagnetic powder included in the magnetic layer of the magnetic tape, it is preferable to use ferromagnetic powder having a small average particle size, from a viewpoint of improvement of recording density of the magnetic tape. From this viewpoint, an average particle size of the ferromagnetic hexagonal ferrite powder is preferably equal to or smaller than 50 nm, more preferably equal to or smaller than 40 nm, even more preferably equal to or smaller than 35 nm, and still more preferably equal to or smaller than 30 nm. Meanwhile, the average particle size of the ferromagnetic hexagonal ferrite powder is preferably equal to or greater than 10 nm and more preferably equal to or greater than 15 nm, from a viewpoint of stability of magnetization.

The average particle size of various powders of the invention and the specification is a value measured by the following method by using a transmission electron microscope.

The powder is imaged at a magnification ratio of 100,000 by using a transmission electron microscope. In the transmission electron microscope image obtained by the imaging, an outline of the particle is traced by using image analysis software and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, JEM-2100 Plus manufactured by JEOL, Ltd. can be used, for example. In addition, the measurement of the particle size can be performed by using well-known image analysis software, for example, Image J (National Institutes of Health, open source).

In the invention and the specification, the average particle size of the ferromagnetic hexagonal ferrite powder and other powder is an average particle size obtained by the method described above, unless otherwise noted. The average particle size shown in examples which will be described later is measured by using JEM-2100 Plus manufactured by JEOL, Ltd. as the transmission electron microscope, and Image J as the image analysis software.

In the invention and the specification, (1) in a case where the shape of the particle observed in the particle image described above is a needle shape, a fusiform shape, or a columnar shape (here, a height is greater than a maximum long diameter of a bottom surface), the size (hereinafter, referred to as a "particle size") of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

As a method for collecting a sample powder such as ferromagnetic powder from the magnetic tape in order to measure the particle size, a method disclosed in a paragraph of 0015 of JP2011-048878A can be used, for example. An average particle size of ferromagnetic hexagonal ferrite powder used in the preparation of the magnetic layer forming composition and an average particle size of ferromagnetic hexagonal ferrite powder include in the magnetic layer may be the same as each other or different from each other. In the following description, the ferromagnetic hexagonal ferrite powder used in the preparation of the magnetic layer forming composition is also referred to as a "raw material powder", and the hexagonal ferrite particles included in the raw material powder is also referred to as "raw material particles" or simply "particles".

In the related art, it has been found that a particle shape of the hexagonal ferrite particles included in the ferromagnetic hexagonal ferrite powder is preferably a hexagonal plate shape. Meanwhile, regarding the particle shape of the raw material particles included in the raw material powder, the inventors have thought that a shape in a plan view of the particles in a direction orthogonal to an axial direction in which magnetization is easily performed, is preferably a shape close to a disk shape. This is because the chipping of the hexagonal ferrite particles having such a shape hardly occurs in a dispersing process performed in the preparation step of the magnetic layer forming composition. Regarding the raw material powder used in the preparation of the magnetic layer forming composition, an arithmetical mean of 500 raw material particles of T (unit: %) calculated by Expression 2 is preferably equal to or smaller than 30.0%, from a viewpoint of preventing occurrence of the chipping.

$$T = 100 \times \sqrt{\frac{1}{m-1} \sum_{\omega t=0 \sim 2\pi} (X(\omega t) - \rho)^2} \bigg/ \rho \quad \text{Expression 2}$$

Each value in Expression 2 is obtained by using the transmission electron microscope image obtained by imaging by the method described above in the part of the measurement of the average particle size. Here, the transmission electron microscope image described above in the part of the measurement of the average particle size is captured without performing the orientation process with respect to an imaging target powder. With respect to this, the transmission electron microscope image for obtaining the T is captured after performing the orientation process with respect to a sample for imaging prepared by using the raw material powder of the measurement target in the vertical direction (direction orthogonal to the horizontal plane). From a viewpoint of easily observing the particle shape of the hexagonal ferrite particles included in the raw material powder of the measurement target, the sample for imaging is preferably prepared by the method capable of preventing aggregation of particles. An example of such a preparation method will be described later in Examples. Magnetic field strength in the orientation process performed with respect to the sample for imaging is not limited. One example will be described later in Examples. By performing the orientation process in the vertical direction, a plan view image of particles in the direction orthogonal to an axis in which magnetization is easily performed, can be imaged by using a transmission electron microscope. $X(\omega t)$ is a distance from the center of a circumscribed circle of a particle in a polar coordinate $\omega t$ direction to an outline (edge) of the particle, and $X(\omega t)$ is measured at total m points by changing the measurement points and with $\omega t$ of 0 to $2\pi$ rad. m is 360, and an interval between the measurement points is $5.6 \times 10^{-3}7$ rad. $\rho$ is an arithmetical mean of $X(\omega t)$ measured at total m points. The unit of $X(\omega t)$ and $\rho$ may be any unit, as long as it is a unit representing a distance. Here, the unit of $X(\omega t)$ and $\rho$ is the same unit. The T is preferably equal to or smaller than 30.0%, more preferably equal to or smaller than 25.0%, even more preferably equal to or smaller than 20.0%, and still more preferably equal to or smaller than 15.0%. The T can be, for example, equal to or greater than 5.0%. Here, a small value of the T is preferable, because the planar shape of the raw material particles included in the raw material powder is close to a disk shape. Accordingly, the T may be smaller than 5.0%.

As a preparation method of the ferromagnetic hexagonal ferrite powder, a glass crystallization method, a coprecipitation synthesis method, a reverse micelle method, or a hydrothermal method is known. Any of the preparation methods is well known. The particle shape of the raw material powder can be controlled by using preparation conditions. As an example, the glass crystallization method will be described below. However, the raw material powder is not limited to raw material powder prepared by the glass crystallization method.

A preparation step of preparing ferromagnetic hexagonal ferrite powder by the glass crystallization method generally includes the following steps.

(1) a step of melting a raw material mixture including a hexagonal ferrite forming component (arbitrarily including a coercive force adjusting component) and a glass forming component and obtaining a molten material (melting step);

(2) a step of rapidly cooling the molten material to obtain an amorphous material (amorphization step);

(3) a step of performing a heating process with respect to the amorphous material and precipitating hexagonal ferrite particles (crystallizing step); and (4) a step of collecting hexagonal ferrite particles precipitated from the heating process (particle collecting step).

As a method for obtaining the raw material powder including particles having the preferred particle shape described above, a method of adjusting a composition of the raw material mixture can be used. The raw material mixture used in the glass crystallization method includes the hexagonal ferrite forming component (arbitrarily including a coercive force adjusting component) and the glass forming component, as described above. Here, the glass forming component is a component which realizes a glass transition phenomenon and can be amorphous (glass), and in a normal glass crystallization method, a $B_2O_3$ component is used. Each component included in the raw material mixture in the glass crystallization method is present as oxides or as various salts which can be changed into oxides in a step of melting and the like. For example, the "$B_2O_3$ component" is a component including $B_2O_3$ or various salts such as $H_3BO_3$ which can be changed into $B_2O_3$ during the steps. The same applies to other components described below. In addition, the composition of the raw material mixture described below is shown as a composition in terms of oxide. Examples of the glass forming component other than the $B_2O_3$ component include a $SiO_2$ component, a $P_2O_5$ component, a $GeO_2$ component, and an $Al_2O_3$ component.

The hexagonal ferrite forming component included in the raw material mixture is a component which is a constituent component of the hexagonal ferrite particles, and a metal oxide such as $Fe_2O_3$, BaO, SrO, or PbO is used. For example, a barium ferrite can be obtained by using a BaO component as a main component of the hexagonal ferrite forming component.

As the hexagonal ferrite particles, particles in which a part of Fe is substituted with other metal element for adjusting coercive force can also be obtained. For the coercive force adjusting component including a substituent element, a description disclosed in a paragraph 0022 of JP2014-192256A can be referred to.

In regard to the control of the particle shape, as the content of the hexagonal ferrite forming component (for example, $Fe_2O_3$ component) in the raw material mixture increases, the planar shape of the raw material particles tends to be close to a disk shape. In addition, it is also preferable to use the raw material mixture including an $Al_2O_3$ component, in order to obtain raw material particles having a planar shape close to a disk shape. In a case of using the raw material mixture including the $Al_2O_3$ component, as the content of the $Al_2O_3$ component in the raw material mixture increases, the planar shape of the raw material particles tends to be close to a disk shape.

From the viewpoints described above, in regard to the composition of the raw material mixture, the content of the $Fe_2O_3$ component (here, a part of the $Fe_2O_3$ component may be substituted with the coercive force adjusting component) in the raw material mixture is preferably equal to or greater than 20.0 mol %, more preferably equal to or greater than 25.0 mol %, and even more preferably equal to or greater than 30.0 mol %, with respect to 100 mol % of the total amount of the raw material mixture. The content of the $Fe_2O_3$ component can be, for example, equal to or smaller than 50.0 mol %. However, the content thereof may be greater than 50.0 mol %. Meanwhile, the content of the $Al_2O_3$ component in the raw material mixture is preferably equal to or greater than 0.5 mol %, more preferably equal to or greater than 1.0 mol %, even more preferably equal to or greater than 2.0 mol %, still more preferably equal to or greater than 3.0 mol %, and still even more preferably equal to or greater than 4.0 mol %, with respect to 100 mol % of the total amount of the raw material mixture. The content of the $Al_2O_3$ component can be, for example, equal to or smaller than 10.0 mol %. However, the content thereof may be greater than 10.0 mol %. The raw material particles obtained as described above can include, for example, 1.5 to 20.0 atom % of Al with respect to Fe.

As a method for obtaining the raw material powder including particles having the preferred particle shape described above, a method of performing a process of removing a chippable portion from the ferromagnetic hexagonal ferrite powder can be used in the preparation method of preparing the ferromagnetic hexagonal ferrite powder by the glass crystallization method. For example, even in a case where the shape of the particles obtained in the particle collecting step of the glass crystallization method (step (4) described above) is a shape in which the T calculated by Expression 2 exceeds 30.0%, particles having the T equal to or smaller than 30.0% can be obtained by removing the chippable portion such as corners from the particles having such a shape. Accordingly, in a case of performing the process of removing the chippable portion from the ferromagnetic hexagonal ferrite powder, it is possible to easily obtain ferromagnetic hexagonal ferrite powder in which an arithmetical mean of 500 particles of the T calculated by Expression 2 is equal to or smaller than 30.0%, even in a case where the raw material mixture having the composition other than the composition described above is used as the preferred composition for controlling the particle shape.

A specific aspect of the process of removing the chippable portion from the ferromagnetic hexagonal ferrite powder will be described below.

The preparation step of preparing ferromagnetic hexagonal ferrite powder by the glass crystallization method includes the steps (1) to (4) described above. The heat-treated material obtained in the crystallization step of the step (3) generally includes ferromagnetic hexagonal ferrite particles and a glass component. In the particle collecting step of the step (4), it is possible to obtain the ferromagnetic hexagonal ferrite particles by removing the glass component from this heat-treated material. The glass component can be removed by various processes generally performed by the glass crystallizing method such as a heating and acid treatment. By performing a process based on a dispersing process performed in the preparation step of the magnetic layer forming composition with respect to the particles obtained by removing the glass component, it is possible to remove or decrease the size of the portion which may chip, that is, the portion which may cause generation of super fine particles due to chipping, in the preparation step of the magnetic layer forming composition. As such a process, beads dispersion can be used, for example. The beads dispersion is a dispersing process using beads (dispersion beads) as a dispersion medium. In the beads dispersion, a solution including particles which is a dispersion target and the dispersion beads is dispersed by a dispersion device and dispersion liquid can be obtained. As the dispersion device, a sand mill can be used, for example. A filling percentage of the dispersion beads in the dispersion device is preferably approximately 30 to 80 vol % based on volume, a rotation speed of the dispersion device is preferably approximately 1,000 to 3,000 resolution per minute (rpm), and a dispersion time (retention time in the dispersion device) is preferably 60 to 360 minutes. In addition, a bead diameter of the dispersion beads is preferably approximately 0.03 to 1.0 mm. In addition, zirconia beads are preferable as the dispersion beads.

After that, the dispersion liquid obtained by the dispersion process is subjected to a centrifugal separation process, for example, and thus, the super fine particles generated due to partial chipping of the particles by the dispersing process can be removed. Then, ferromagnetic hexagonal ferrite powder in which an arithmetical means of 500 particles of the T calculated by Expression 2 is equal to or smaller than 30.0% can be obtained through a drying process.

A well-known technology can be applied for the other details regarding the glass crystallization method without any limitation. For the details of each step of the glass crystallization method, the description disclosed in paragraphs 0018 to 0029 of JP2014-192256A and paragraphs 0011 to 0025 of JP2010-24113A can be referred to.

However, the ferromagnetic hexagonal ferrite powder included in the magnetic layer of the magnetic tape is not limited to the ferromagnetic hexagonal ferrite powder prepared by the glass crystallization method. For example, the ferromagnetic hexagonal ferrite powder included in the magnetic layer of the magnetic tape can also be prepared by the hydrothermal method. For the hydrothermal method, the description disclosed in paragraphs 0037 to 0103 of JP2015-201246A and Examples in JP2015-201246A can be referred to.

Hereinafter, the magnetic tape will be described more specifically.

Magnetic Layer

Ferromagnetic Powder

The ferromagnetic powder included in the magnetic layer is as described above. The content (filling percentage) of the ferromagnetic powder in the magnetic layer is preferably of 50 to 90 mass % and more preferably 60 to 90 mass %. The components other than the ferromagnetic powder of the magnetic layer are at least a binding agent and one or more kinds of additives may be arbitrarily included. A high filling percentage of the ferromagnetic powder in the magnetic layer is preferable from a viewpoint of improvement recording density.

Binding Agent and Curing Agent

The magnetic layer of the magnetic tape includes a binding agent together with the ferromagnetic powder. The binding agent is one or more kinds of resin. These resins may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in a non-magnetic layer and/or a back coating layer which will be described later. For the binding agent described above, description disclosed in paragraphs 0029 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in Examples which will be described later is a value obtained by performing polystyrene conversion of a value measured under the measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, at the time of forming the magnetic layer, a curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the preparation step of the magnetic tape. The preferred curing agent is a thermosetting compound and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer.

Additives

The magnetic layer can include one or more kinds of additives, if necessary. As an example of the additives, the curing agent described above is used. Examples of the additives included in the magnetic layer include non-magnetic powder (for example, an abrasive or a projection formation agent which can form projections capable of contributing to the control of friction properties of the surface of the magnetic layer), a lubricant, a dispersing agent, a dispersing assistant, an antibacterial agent, an antistatic agent, an antioxidant, and carbon black. As the additives, a commercially available product or an additive prepared by a well-known method can be suitably selected and used according to desired properties. As a preferred example of the additives, a compound including a polyakyleneimine chain and a polyester chain disclosed in JP2015-28830A can be used. For the details of such a compound, the description disclosed in paragraphs 0026 to 0071 of JP2015-28830A and Examples in JP2015-28830A can be referred to. However, the compound is merely an example and various well-known additives can be used as the additives.

Non-Magnetic Layer

Next, the non-magnetic layer will be described.

The magnetic tape may directly include a magnetic layer on a surface of a non-magnetic support, or may include a non-magnetic layer, including non-magnetic powder and a binding agent, between the non-magnetic support and the magnetic layer. The non-magnetic powder used in the non-magnetic layer may be inorganic powder or organic powder. In addition, carbon black and the like can also be used. Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0036 to 0039 of JP2010-24113A can be referred to. The content (filling percentage) of the non-magnetic powder in the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

As the non-magnetic support (hereinafter, also simply referred to as a "support"), well-known components such as polyethylene terephthalate, polyethylene naphthalate, polyamide, polyamide imide, aromatic polyamide (for example, aramid) subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Back Coating Layer

The magnetic tape includes a back coating layer, including non-magnetic powder and a binding agent, on a surface side of the non-magnetic support opposite to a surface side provided with the magnetic layer. The back coating layer preferably includes one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

Regarding thicknesses of the non-magnetic support and each layer of the magnetic tape, a thickness of the non-magnetic support is preferably 3.00 to 6.00 µm and more preferably 3.00 to 4.50 µm.

A thickness of the magnetic layer can be optimized in accordance with saturation magnetization quantity of the magnetic head used, a head gap length, or a band of a recording signal. The thickness of the magnetic layer is normally 10 nm to 150 nm, and is preferably 20 nm to 120 nm and more preferably 30 nm to 100 nm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.01 to 3.00 µm, preferably 0.05 to 2.00 µm, and more preferably 0.05 to 1.50 µm.

A thickness of the back coating layer is preferably equal to or smaller than 0.90 µm and more preferably 0.10 to 0.70 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be determined as a designed thickness calculated according to the manufacturing conditions.

Manufacturing Method of Magnetic Tape

The steps of preparing a composition for forming the magnetic layer, the non-magnetic layer, or the back coating layer generally include at least a kneading step, a dispersing step, and a mixing step provided before and after these steps, if necessary. Each step may be divided into two or more stages. Various components may be added at an initial stage or in a middle stage of each step. In addition, each component may be separately added in two or more steps. For example, the binding agent may be separately added in a kneading step, a dispersing step, and a mixing step of adjusting viscosity before and after the dispersion. In order to manufacture a magnetic recording medium, a well-known manufacturing technology of the related art can be used in a part of or all of the steps. In the kneading step, an open kneader, a continuous kneader, a pressure kneader, or a kneader having a strong kneading force such as an extruder is preferably used. For the details of the kneading processes, JP1989-106338A (JP-H1-106338A) and JP1989-79274A (JP-H1-79274A) can be referred to. In addition, in order to disperse a composition for forming each layer, glass beads can be used as a dispersion beads. As such dispersion beads, zirconia beads, titania beads, and steel beads which are dispersion beads having high specific gravity are also suitable. These dispersion beads can be used by optimizing a particle diameter (bead diameter) and a filling percentage of the dispersion beads. As a dispersion device, a well-known dispersion device can be used.

In the preparation step of the magnetic layer forming composition, it is preferable that a magnetic solution including the ferromagnetic hexagonal ferrite powder, a binding agent, and a solvent (here, substantially not including an abrasive), and an abrasive liquid including an abrasive and a solvent are respectively prepared in separate steps. By performing the mixing after separately dispersing the ferromagnetic hexagonal ferrite powder and the abrasive as described above, it is possible to increase the dispersibility of the ferromagnetic hexagonal ferrite powder in the magnetic layer forming composition. The expression of "substantially not including an abrasive" means that the abrasive is not added as a constituent component of the magnetic solution, and a small amount of the abrasive present as impurities by being mixed without intention is allowed. The abrasive means non-magnetic powder having Mohs hardness exceeding 8 and is preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. In addition, regarding the particle size of the abrasive, a Brunauer-Emmett-Teller (BET) specific surface area which is an index of the particle size is, for example, equal to or greater than 14 $m^2/g$, and is preferably equal to or greater than 16 $m^2/g$ and more preferably equal to or greater than 18 $m^2/g$. Further, the BET specific surface area of the abrasive can be, for example, equal to or smaller than 40 $m^2/g$. The BET specific surface area is a specific surface area measured regarding primary particles by a BET Method.

The preparation step of a magnetic solution preferably includes one or more kinds of dispersing processes. It is preferable that dispersibility of the ferromagnetic hexagonal ferrite powder in the magnetic layer is high, in order to increase the squareness ratio by the orientation process. Accordingly, it is preferable that dispersibility of the ferromagnetic hexagonal ferrite powder in the magnetic solution is increased by the dispersing process. From a viewpoint of increasing dispersibility, it is preferable to at least perform a dispersing process using a dispersion medium, as the dispersing process of the magnetic solution. In the dispersing process using a dispersion medium, a force for cracking aggregation of particles of the ferromagnetic hexagonal ferrite powder is normally stronger than that in a dispersing process not using a dispersion medium (for example, ultrasonic dispersion), and therefore, the dispersing process using a dispersion medium is effective for improving dispersibility of the ferromagnetic hexagonal ferrite powder in the magnetic solution. However, occurrence of the chipping of the particles of the ferromagnetic hexagonal ferrite powder by the dispersing process may cause generation of super fine particles considered as a reason of an increase of the A calculated by Expression 1. As a result, thermal stability may be deteriorated and/or electromagnetic conversion characteristics during repeated running may be deteriorated. Accordingly, it is preferable that the dispersing process of the magnetic solution is performed so as to reduce a damage on the particles of the ferromagnetic hexagonal ferrite powder and to crack the aggregation of the particles. From the viewpoints described above, the preferred dispersing process is the beads dispersion. In addition, it is particularly preferable that the beads dispersion is performed under the conditions in which E calculated by Expression 3 is equal to or smaller than 10,000 nJ and W calculated by Expression 4 is 1.0 J·min. to 30.0 J·min.

$$E = (a \times v^2 \times 10^6)/2 \qquad \text{Expression 3:}$$

$$W = E \times 10^{-9} \times b \times t \qquad \text{Expression 4:}$$

In Expression 3, the unit of E is nJ, a represents the total mass of the beads used in the beads dispersion (unit: g), and v represents a movement velocity of the beads during the beads dispersion (unit: m/sec.). As the movement velocity v of the beads, a value of linear velocity of an outermost peripheral part of a rotor calculated from a radius of a rotor of a dispersing device and a rotation speed of the rotor set in the dispersing device can be applied.

In Expression 4, E is obtained by Expression 3. The unit of W is J·min., and b represents the number of beads used for 1 cm$^3$ of the magnetic solution in the beads dispersion and also represents number density of the beads (unit: pieces/cm$^3$) below. T represents a dispersion time of the beads dispersion (unit: min.).

A large value of E calculated by Expression 3 means a great collision energy of the dispersion beads. The E is preferably equal to or smaller than 10,000 nJ, from a viewpoint of preventing chipping from occurring in the raw material particles due to collision with the dispersion beads. The E is more preferably equal to or smaller than 7,000 nJ, even more preferably equal to or smaller than 5,000 nJ, still preferably equal to or smaller than 3,000 nJ, still more preferably equal to or smaller than 2,000 nJ, still even more preferably equal to or smaller than 1,000 nJ, still further more preferably equal to or smaller than 500 nJ, and still even further more preferably equal to or smaller than 100 nJ. The E can be, for example, equal to or greater than 20 nJ or equal to or greater than 30 nJ. However, the E may be smaller than the lower limit described above.

Meanwhile, a value of W calculated by Expression 4 which is equal to or smaller than 30.0 J·min. means that a collision energy of the dispersion beads is not excessively great, and it is preferable from a viewpoint of preventing the chipping. The W is more preferably equal to or smaller than 20.0 J·min., even more preferably equal to or smaller than 15.0 J·min., and still more preferably equal to or smaller than 10.0 J·min. In addition, the W is preferably equal to or greater than 1.0 J·min., in order to increase dispersibility of the ferromagnetic hexagonal ferrite powder in the magnetic solution. The W is preferably equal to or greater than 2.0 J·min, more preferably equal to or greater than 3.0 J·min., and even more preferably equal to or greater than 5.0 J·min.

Regarding the dispersion beads used in the beads dispersion of the magnetic solution, a density of the dispersion beads is preferably greater than 3.7 g/cm$^3$ and more preferably equal to or greater than 3.8 g/cm$^3$. In addition, the density of the dispersion beads is, for example, equal to or greater than 7.0 g/cm$^3$ or may be greater than 7.0 g/cm$^3$. Here, the density is obtained by dividing the mass of the dispersion beads (unit: g) by the volume of the dispersion beads (unit: cm$^3$). The measurement is performed by Archimedes method. As the dispersion beads, beads made of zirconia, alumina, or stainless steel may be singly used, or a mixture of two or more kinds thereof is preferably used. A bead diameter of the dispersion beads used in the beads dispersion of the magnetic solution is preferably 0.01 to 0.50 mm. The bead diameter is a value measured by the same method as the measurement method of the average particle size of the powder described above regarding the dispersion beads used in the dispersing process. A filling percentage of the dispersion beads in the dispersion device is, for example, 30 to 80 vol % and preferably 50 to 80 vol % based on volume. In addition, a dispersion time (retention time in the dispersion device) is preferably 10 to 180 minutes and more preferably 10 to 120 minutes.

After other dispersing processes, if necessary, the magnetic solution after the beads dispersion is mixed with other components such as abrasive liquid at the same time or in order, and thus, a magnetic layer forming composition can be prepared. For other details such as the preparation of the abrasive liquid, a well-known technology regarding the preparation of the magnetic layer forming composition can be applied without any limitation.

For other details of the preparation method of the magnetic recording medium, descriptions disclosed in paragraphs 0051 to 0057 of JP2010-24113A can also be referred to, for example. For the orientation process, descriptions disclosed in a paragraph 0052 of JP2010-24113A can be referred to.

The magnetic tape is a magnetic tape which includes the ferromagnetic hexagonal ferrite powder in the magnetic layer, in which excellent electromagnetic conversion characteristics can be exhibited, electromagnetic conversion characteristics during repeated running can also be prevented, and excellent thermal stability can also be exhibited.

EXAMPLES

Hereinafter, the invention will be described with reference to Examples. However, the invention is not limited to aspects shown in the examples. "Parts" and "%" in the following description mean "parts by mass" and "mass %", unless otherwise noted.

The steps and evaluations described below were performed in an environment of room temperature (20° C. to 25° C.), unless otherwise noted.

Preparation Examples of Ferromagnetic Hexagonal Ferrite Powders (Preparation Examples of Ferromagnetic Hexagonal Ferrite Powders 1 to 5)

Each predetermined amount of a $B_2O_3$ component ($H_3BO_3$), an $Al_2O_3$ component ($Al(OH)_3$), a BaO component ($BaCO_3$), a $Fe_2O_3$ component, and $Ta_2O_5$ corresponding to an element Ta for being substituted with Fe and adjusting coercive force was weighed so as to obtain a raw material composition shown in Table 1 in terms of an oxide and mixed with each other in a mixer to prepare a raw material mixture. The prepared raw material mixture was put and melted in a platinum crucible having volume of 2 L, a molten material was subjected to continuous tapping on a water cooling roll to cool by the water cooling roll, and an amorphous material was obtained.

600 g of the obtained amorphous material was put in an electric furnace, heated to a temperature (crystallization temperature) shown in Table 1 for 3 hours, and held at the same temperature for 5 hours, and a hexagonal ferrite was crystallized.

Then, the crystallized material including the hexagonal ferrite was roughly pulverized with a mortar, put in a pot mill of 3 L, and subjected to a pulverization process by a ball mill with 5 kg of $ZrO_2$ ball having a diameter of 5 mm and 1.2 kg of pure water for 4 hours. After that, the pulverized solution was separated from the $ZrO_2$ ball and put in a stainless steel beaker having volume of 5 L. The pulverized solution was added to 8 mass % of acetic acid medium, and held at a solution temperature of 85° C. for 2 hours, decantation washing was repeated to remove unnecessary glass components, and the resultant material was dried to obtain powder. Regarding the obtained powder, X-ray diffraction analysis was performed and a crystalline structure of the hexagonal ferrite was confirmed. By doing so, ferromagnetic hexagonal ferrite powders (ferromagnetic hexagonal barium ferrite powders) 1 to 5 were obtained.

Preparation Examples of Ferromagnetic Hexagonal Ferrite Powder (Preparation Examples of Ferromagnetic Hexagonal Ferrite Powder 6)

Each predetermined amount of a $B_2O_3$ component ($H_3BO_3$), an $Al_2O_3$ component ($Al(OH)_3$), a BaO component ($BaCO_3$), a $Fe_2O_3$ component, and $Ta_2O_5$ corresponding to an element Ta for being substituted with Fe and adjusting coercive force was weighed so as to obtain a raw material composition shown in Table 1 in terms of an oxide and mixed with each other in a mixer to prepare a raw material mixture. The prepared raw material mixture was put and melted in a platinum crucible having volume of 2 L, a molten material was subjected to continuous tapping on a water cooling roll to cool by the water cooling roll, and an amorphous material was obtained.

600 g of the obtained amorphous material was put in an electric furnace, heated to a temperature (crystallization temperature) shown in Table 1 for 3 hours, and held at the same temperature for 5 hours, and a hexagonal ferrite was crystallized.

Then, the crystallized material including the hexagonal ferrite was roughly pulverized with a mortar, put in a pot mill of 3 L, and subjected to a pulverization process by a ball mill with 5 kg of $ZrO_2$ ball having a diameter of 5 mm and 1.2 kg of pure water for 4 hours. After that, the pulverized solution was separated from the $ZrO_2$ ball and put in a stainless steel beaker having volume of 5 L. The pulverized solution was added to 8 mass % of acetic acid medium, and held at a solution temperature of 85° C. for 2 hours, decantation washing was repeated to remove unnecessary glass components. The washed solution was allowed to flow to a horizontal sand mill (beads filling percentage: 50 vol %, dispersion beads: zirconia beads having a bead diameter of 0.5 mm) by using a pump, and subjected to a dispersing process (beads dispersion) at a rotation speed of 2,000 rpm for 180 minutes. A dispersion liquid obtained by the beads dispersion was subjected to a centrifugal separation process to remove super fine particles generated in the beads dispersion, and the resultant material was dried to obtain powder. Regarding the obtained powder, X-ray diffraction analysis was performed and a crystalline structure of the hexagonal ferrite was confirmed. By doing so, a ferromagnetic hexagonal ferrite powder (ferromagnetic hexagonal barium ferrite powder) 6 was obtained.

Evaluation of Ferromagnetic Hexagonal Ferrite Powder
(1) Average Particle Size

An average particle size of the ferromagnetic hexagonal ferrite powders 1 to 6 was obtained by the method described above.

(2) T Calculated by Expression 2

Regarding the ferromagnetic hexagonal ferrite powders 1 to 6, the T calculated by Expression 2 was obtained by the following method.

The ferromagnetic hexagonal ferrite powder (imaging target powder) was put into pure water and subjected to ultrasonic dispersion (ultrasonic treatment device: UIS250V manufactured by Hielscher Ultrasonics GmbH, operation conditions of the ultrasonic treatment device: intermittent operation (operation was performed for 0.5 seconds and then stopped for 0.5 seconds) was repeated at a frequency of 24 kHz for 6 hours) to prepare a dispersion liquid (concentration of solid contents of 0.01%).

Acetic acid was added to the prepared dispersion liquid so that concentration of acetic acid in the dispersion liquid becomes 1%. After that, the dispersion liquid was subjected to the ultrasonic dispersion by using the same device under the same operation conditions as described above.

Gelatin was added to the dispersion liquid after the ultrasonic dispersion so that concentration of gelatin becomes 0.03%.

A sample solution prepared by the method described above was added dropwise from the top of a grid mesh (mesh-like sample dish) and dried while applying an external magnetic field of 478 kA/m (6 kOe) in a vertical direction to the horizontal plane (that is, while performing the orientation process in the vertical direction), and a sample for imaging was obtained.

The sample for imaging was imaged at a magnification ratio of 100,000 by using a transmission electron microscope (JEM-2100 Plus manufactured by JEOL, Ltd.) and a transmission electron microscope image was obtained.

Figure 2:
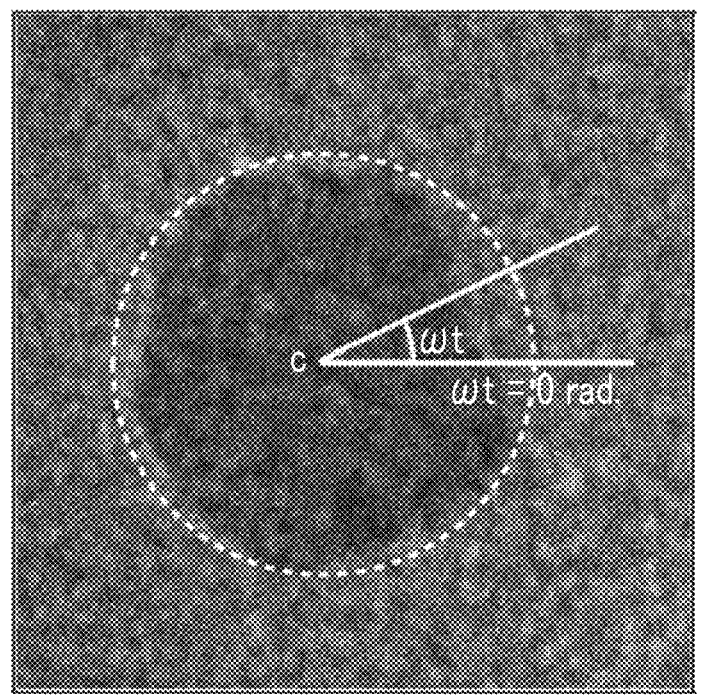
FIG. 2 shows a transmission electron microscope image of a particle included in the ferromagnetic hexagonal ferrite powder 1 used in Examples.
Figure 3:
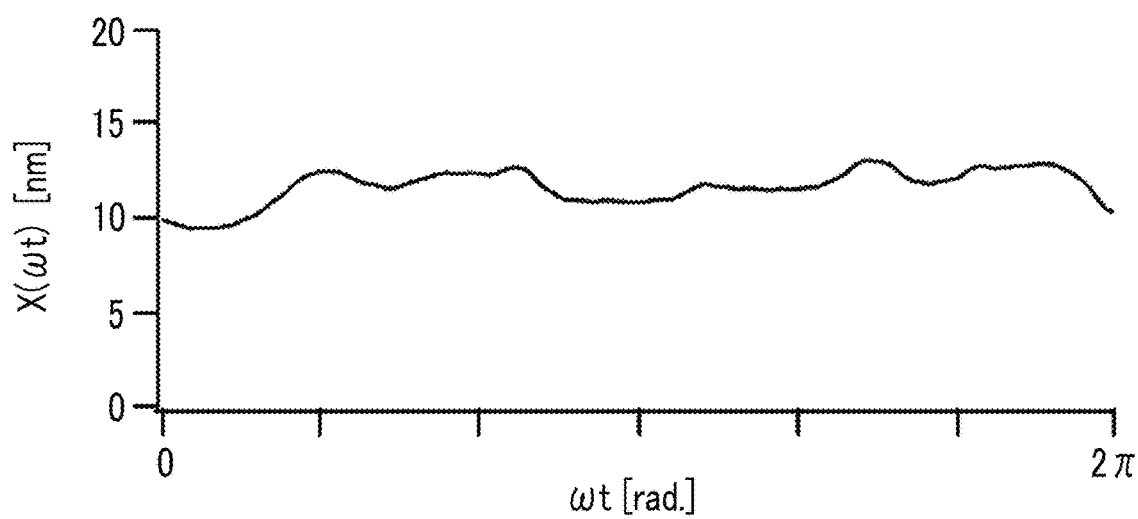
FIG. 3 is a graph drawn by indicating X(ωt) measured regarding the particles shown in FIG. 1 and FIG. 2 on a vertical axis and indicating polar coordinates ωt on a horizontal axis.

Various values for calculating T by Expression 2 was obtained by using the obtained transmission electron microscope image. As an example, FIGS. 1 and 2 show transmission electron microscope images of a particle included in the ferromagnetic hexagonal ferrite powder 1. In FIG. 2, lines were drawn in the transmission electron microscope image of a particle shown in FIG. 1 for explaining a circumscribed circle, a center C of the circumscribed circle, and a polar coordinate ωt. The measurement point m was set as 360 and the interval between the measurement points was set as $5.6 \times 10^{-3}\pi$ rad. FIG. 3 is a graph drawn by indicating X(ωt) measured regarding the particles shown in FIG. 1 and FIG. 2 on a vertical axis and indicating polar coordinates ωt on a horizontal axis. Such measurement was respectively performed regarding 500 particles of the ferromagnetic hexagonal ferrite powders 1 to 5, and T was obtained as an arithmetical mean of the obtained values.

The results described above are shown in Table 1.

TABLE 1

| | Raw material mixture composition | | | | | | | |
|---|---|---|---|---|---|---|---|---|
| | | | | | Content of Ta with | | Evaluation | |
| | | | | $Fe_2O_3$ (also | respect to | | | |
| Ferromagnetic hexagonal ferrite powder No. | BaO (mol %) | $B_2O_3$ (mol %) | $Al_2O_3$ (mol %) | including $Ta_2O_5$) (mol %) | 100 atom % of Fe (atom %) | Crystallization temperature (° C.) | Average particle size (nm) | T (%) |
| 1 | 40.3 | 18.5 | 6.2 | 35.0 | 1 | 700 | 25 | 8 |
| 2 | 38.4 | 20.9 | 6.2 | 34.5 | 1 | 680 | 23 | 15 |

TABLE 1-continued

| Ferromagnetic hexagonal ferrite powder No. | Raw material mixture composition | | | | | Evaluation | | |
|---|---|---|---|---|---|---|---|---|
| | BaO (mol %) | $B_2O_3$ (mol %) | $Al_2O_3$ (mol %) | $Fe_2O_3$ (also including $Ta_2O_5$) (mol %) | Content of Ta with respect to 100 atom % of Fe (atom %) | Crystallization temperature (° C.) | Average particle size (nm) | T (%) |
| 3 | 43.7 | 26.4 | 1.4 | 28.5 | 1 | 630 | 25 | 21 |
| 4 | 38.6 | 34.1 | 0.0 | 27.3 | 1 | 620 | 24 | 32 |
| 5 | 41.8 | 38.4 | 0.0 | 19.8 | 1 | 600 | 25 | 38 |
| 6 | 41.8 | 38.4 | 0.0 | 19.8 | 1 | 600 | 21 | 13 |

Example 1

1. Preparation of Alumina Dispersion (Abrasive Liquid)

3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 m²/g, and dispersed in the presence of zirconia beads by a paint shaker for 5 hours. After the dispersion, the dispersion liquid and the beads were separated by a mesh and an alumina dispersion was obtained.

2. Magnetic Layer Forming Composition List

Magnetic Solution

Ferromagnetic hexagonal barium ferrite powder 1: 100.0 parts $SO_3Na$ group-containing vinyl chloride copolymer: 10.0 parts Weight-average molecular weight: 70,000, $SO_3Na$ group: 0.2 meq/g $SO_3Na$ group-containing polyurethane resin: 4.0 parts Weight-average molecular weight: 70,000, $SO_3Na$ group: 0.2 meq/g A polyalkyleneimine derivative (J-2) obtained by a method disclosed in Synthesis Example 22 disclosed in JP2015-28830A: 10.0 parts Cyclohexanone: 150.0 parts Methyl ethyl ketone: 170.0 parts Abrasive liquid Alumina dispersion prepared in the section 1: 6.0 parts Silica Sol Colloidal silica: 2.0 parts Average particle size: 100 nm Other Components Stearic acid: 2.0 parts Butyl stearate: 6.0 parts Polyisocyanate (CORONATE (registered trademark) manufactured by Tosoh Corporation): 2.5 parts Finishing Additive Solvent Cyclohexanone: 300.0 parts Methyl ethyl ketone: 140.0 parts 3. Non-Magnetic Layer Forming Composition List Carbon black: 100.0 parts Average particle size: 20 nm $SO_3Na$ group-containing vinyl chloride copolymer: 10.0 parts Weight-average molecular weight: 70,000, $SO_3Na$ group: 0.2 meq/g $SO_3Na$ group-containing polyurethane resin: 4.0 parts Weight-average molecular weight: 70,000, $SO_3Na$ group: 0.2 meq/g Trioctylamine: 5.0 parts Stearic acid: 2.0 parts Butyl stearate: 2.0 parts Cyclohexanone: 450.0 parts Methyl ethyl ketone: 450.0 parts 4. Back Coating Layer Forming Composition List Non-magnetic inorganic powder: α-iron oxide: 80.0 parts Average particle size (average long axis length): 0.15 μm, Average acicular ratio: 7, BET specific surface area: 52 m²/g Carbon black: 20.0 parts Average particle size: 20 nm A vinyl chloride copolymer: 13.0 parts Sulfonic acid salt group-containing polyurethane resin: 6.0 parts Phenylphosphonic acid: 3.0 parts Cyclohexanone: 355.0 parts Methyl ethyl ketone: 155.0 parts Stearic acid: 3.0 parts Butyl stearate: 3.0 parts Polyisocyanate: 5.0 parts 5. Preparation of Each Layer Forming Composition The magnetic layer forming composition was prepared by the following method.

Each component of the magnetic solution was mixed with each other with a homogenizer and then, bead-dispersed by using a continuous transverse beads mill. The process conditions of the beads dispersion are shown in Table 3. The movement velocity v of the beads during the beads dispersion shown in Table 3 is a linear velocity of an outermost peripheral part of a rotor calculated from a radius of a rotor of the beads mill and a rotation speed of the rotor set in the beads mill.

The prepared magnetic solution was mixed with the abrasive liquid and other components (silica sol, other components, and finishing additive solvents) by using the beads mill, and subjected to treatment (ultrasonic dispersion) in a batch type ultrasonic device (20 kHz, 300 W) for 0.5 minutes. After that, filtering was performed by using a filter having an average hole diameter of 0.5 μm and a magnetic layer forming composition was prepared.

The non-magnetic layer forming composition was prepared by the following method.

Each component excluding stearic acid and butyl stearate was dispersed by using a batch type vertical sand mill for 12 hours to obtain dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered by using a filter having an average hole diameter of 0.5 µm and a non-magnetic layer forming composition was prepared.

The back coating layer forming composition was prepared by the following method.

Each component excluding stearic acid, butyl stearate, polyisocyanate, and cyclohexanone was kneaded and diluted by an open kneader. Then, the obtained mixed liquid was subjected to a dispersing process of 12 passes, with a transverse beads mill by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 µm and a back coating layer forming composition was prepared.

6. Manufacturing of Magnetic Tape

The non-magnetic layer forming composition prepared in the section 5. was applied to the surface of a support made of aramid having a thickness of 3.60 µm so that the thickness after the drying becomes 0.10 and dried, to form a non-magnetic layer. The magnetic layer forming composition prepared in the section 5. was applied onto the surface of the formed non-magnetic layer so that the thickness after the drying becomes 70 nm, to form a coating layer. The orientation process was performed by applying a magnetic field having a magnetic field strength of 0.4 T to the surface of the coating layer in a vertical direction or a longitudinal direction, while the coating layer was not dried. Then, the coating layer was dried.

After that, the back coating layer forming composition prepared in the section 5. was applied to the surface of the support made of aramid opposite to the surface where the non-magnetic layer and the magnetic layer are formed, so that the thickness after the drying becomes 0.40 µm, and dried.

Then, a surface smoothing treatment (calender process) was performed with a calender configured of only a metal roll, at a speed of 100 m/s, linear pressure of 300 kg/cm (294 kN/m), and a surface temperature of a calender roll of 100° C.

After that, a thermal treatment was performed in the environment of the atmosphere temperature of 70° C. for 36 hours. Then, the resultant material was cut to have a width of ½ inches (0.0127 meters), and a magnetic tape was obtained.

The thickness of each layer is designed thickness calculated according to the manufacturing conditions.

7. Measurement Using Vibrating Sample Magnetometer

Three tape samples having a size of 12 mm (short side)×32 mm (long side) were cut out from the manufactured magnetic tape. Each tape sample was folded once on the short side and folded twice on the long side to have a size of 6 mm×8 mm. The three tape samples folded as described above were disposed in a vibrating sample magnetometer in a superposed manner. The three tape samples were superposed so that directions of each tape sample (longitudinal direction and the width direction of the tape sample) coincide with each other.

The sweeping of the external magnetic field was performed at a measurement temperature of 24° C. by using TEM-WF 82.5 R-152 manufactured by Toei Industry Co., Ltd. as the vibrating sample magnetometer, and a hysteresis curve (M-H curve) was obtained. The measurement for obtaining the vertical direction M-H curve was performed by disposing the tape sample in the vibrating sample magnetometer so that the magnetic field applying direction is orthogonal to the longitudinal direction of the tape sample. The measurement for obtaining the longitudinal direction M-H curve was performed by disposing the tape sample in the vibrating sample magnetometer so that the magnetic field applying direction is parallel to the longitudinal direction of the tape sample. The sweeping of the external magnetic field was performed under sweeping conditions shown in Table 2 by setting an average number as 1 in each step. The sweeping is started at the magnetic field strength of 1197 kA/m, continued until the magnetic field strength becomes −1197 kA/m, and performed until the magnetic field strength becomes 1197 kA/m again. The sweeping was performed under the sweeping conditions shown in Table 2 in the order from the upper row to the lower row. The total sweeping time was 312 seconds. The measurement of magnetization quantity only with a sample probe for measurement was performed in advance, and the value was subtracted as background noise at the time of the measurement. Regarding each tape sample, both of the saturated magnetization obtained from the vertical direction M-H curve and the saturated magnetization obtained from the longitudinal direction M-H curve obtained as described above were $5 \times 10^{-6}$ to $10 \times 10^{-6}$ A·m² ($5 \times 10^{-3}$ to $10 \times 10^{-3}$ emu).

TABLE 2

| Upper Limit Field (kA/m) | Lower limit field (kA/m) | Time constant (TC) (sec.) | Step (kA/m) | Stand-by time in each step (sec.) | Time (sec.) |
|---|---|---|---|---|---|
| 1197 | 0 | 0.1 | 6.2 | 0.1 | 27 |
| 0 | −796 | 0.1 | 0.9 | 0.1 | 120 |
| −796 | −1197 | 0.1 | 6.2 | 0.1 | 9 |
| −1197 | 0 | 0.1 | 6.2 | 0.1 | 27 |
| 0 | 796 | 0.1 | 0.9 | 0.1 | 120 |
| 796 | 1197 | 0.1 | 6.2 | 0.1 | 9 |

8. Evaluation of Magnetic Tape (1) Squareness Ratio (SQ)

A vertical direction squareness ratio and a longitudinal direction squareness ratio of the magnetic tape were obtained from the vertical direction M-H curve and the longitudinal direction M-H curve obtained in the measurement of the section 7.

(2) A Calculated by Expression 1

Various values for calculating A by Expression 1 were obtained from the results of the measurement of the section 7.

(3) Electromagnetic Conversion Characteristics (Signal-to-Noise-Ratio (SNR))

A SNR of the magnetic tape was measured by the following method.

A signal at 27.6 MHz (linear recording density of 350 kfci) was recorded and reproduced while running the magnetic tape by the following running method by using a linear head. A reproduction signal was input in U3741 manufactured by Advantest Corporation, and a signal output (S) of a peak signal at 27.6 Hz and integrated noise (N) at 1 MHz to 54.9 MHz excluding 27.6 MHz±0.3 MHz were measured. A ratio of these (S/N) was set as SNR. The SNR was acquired as a relative value in a case where the SNR obtained by the method described above was set as 0 dB in Comparative Example 1 which will be described later. In a case where the SNR is equal to or greater than 1.0 dB, it can be determined that electromagnetic conversion characteristics are excellent.

Running Method

The magnetic tape having a total length of 90 cm was set to have a loop shape and attached to a loop type recording and reproducing device and allowed to run at a relative speed between the head and the magnetic tape (running speed) of 2 m/sec., a back tension of 0.7 N, and a lap angle of 3°.

(4) Thermal Stability

A signal was recorded at linear recording density of 30 kfci with a magnetic tape tester (reel tester) by the following running method, an initial value of the output, when the recorded signal was reproduced, was set as 100%, the same track was reproduced in the magnetic tape after storage at room temperature for 2 weeks, an output decreased from the initial value was shown in Table 3 as a demagnetizing factor as a percentage. In a case where the demagnetizing factor is within −5.0%, it can be determined that thermal stability is excellent.

Running Method

While performing winding and unwinding the magnetic tape between a reel and a reel, and the magnetic tape having a total length of 1,000 m was allowed to run at a relative speed between the head and the magnetic tape (running speed) of 4 m/sec., a back tension of 0.7 N, and a lap angle of 3°.

(5) Change (Decrease in SNR) in Electromagnetic Conversion Characteristics During Repeated Running A SNR after the magnetic tape having a total length of 1,000 m was allowed to reciprocate 3,000 times by the same method as in the section (4) was obtained. A value of a decrease in SNR (SNR after the reciprocating)−(SNR obtained in the section (3)) was calculated from the SNR obtained here and the SNR obtained in the section (3). In a case where a decrease in SNR is within −1.0 dB, it can be determined that a magnetic tape in which electromagnetic conversion characteristics during repeated running are hardly deteriorated is obtained.

Examples 2 to 12 and Comparative Examples 1 to 12

A magnetic tape was obtained by the same method as in Example 1, except that manufacturing conditions of the magnetic tape were changed as shown in Table 3.

Evaluation of the obtained magnetic tape was performed in the same manner as in Example 1.

Figure 4:
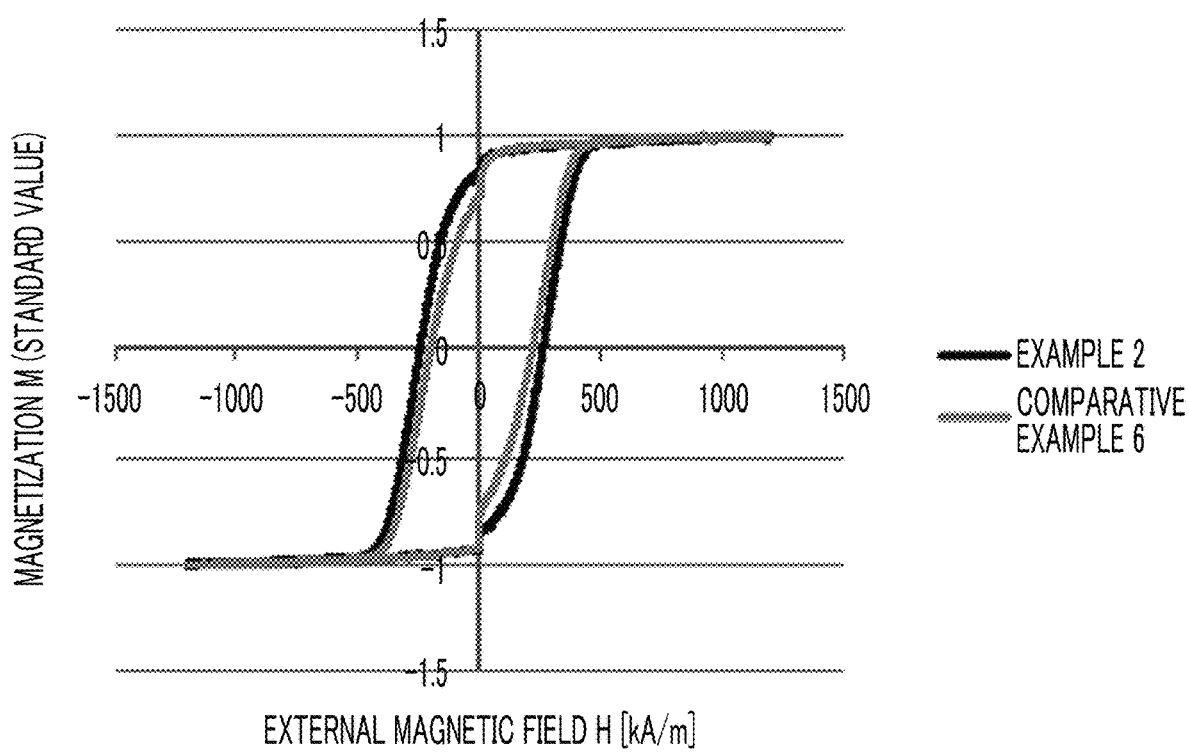
FIG. 4 shows hysteresis curves (M-H curves) obtained in Example 2 and Comparative Example 6.

FIG. 4 is hysteresis curves (M-H curves) obtained by the measurement performed regarding the magnetic tape of Example 2 and the magnetic tape of Comparative Example 6 by using a vibrating sample magnetometer.

In FIG. 4, it can be confirmed that the shape of the M-H curve of Example 2 has a shape of a smooth curve compared to the M-H curve of Comparative Example 6, at the magnetic field strength of −40 kA/m to 40 kA/m. With respect to this, in the M-H curve of Comparative Example 6, for example, a portion with uneven shape of a step shape is observed at the magnetic field strength of 0 kA/m.

It is considered that the difference in the shape of the M-H curves described above is generated because the magnetic tape of Comparative Example 6 includes a large amount of super fine particles described above in the magnetic layer, compared to that in the magnetic tape of Example 2.

Meanwhile, the magnetic tape of Comparative Example 8 has low strength of the magnetic layer, and thus, the magnetic layer is broken during running by the running method, and various evaluations cannot be performed. It is assumed that the main reason thereof is a decrease in strength of the magnetic layer due to generation of a large amount of super fine particles due to the chipping in the beads dispersion of the magnetic solution.

The results described above are shown in Table 3.

TABLE 3

| | Ferromagnetic hexagonal ferrite powder | | Beads dispersion conditions of magnetic solution | | | | | | | | | Magnetic tape evaluation result | | | | | | |
|---|---|---|---|---|---|---|---|---|---|---|---|---|---|---|---|---|---|---|
| | No. | T calculated by Expression 2 [%] | Density of beads [g/cm³] (type of beads) | Bead diameter of beads [mm] | Total mass a of beads [g] | Movement velocity v of beads during beads dispersion [m/sec.] | E calculated by Expression 3 [nJ] | Filling percentage of beads [vol %] | Beads number density b [piece/cm³] | Dispersion time t [min.] | W calculate by Expression 4 [J·min] | Orientation process | Vertical direction SQ | Longitudinal direction SQ | A calculated by Expression 1 [%] | SNR [dB] | Thermal stability [%] | Decrease in SNR [dB] |
| Comparative Example 1 | 1 | 8.5 | 6.0 (Zirconia beads) | 0.05 | 3.9E-07 | 15 | 44 | 60 | 6.11E+06 | 3 | 0.8 | Vertical | 0.65 | 0.43 | 3.7 | 0.0 | 0.0 | 0.0 |
| Example 1 | 1 | 8.5 | 6.0 (Zirconia beads) | 0.05 | 3.9E-07 | 15 | 44 | 60 | 6.11E+06 | 10 | 2.7 | Vertical | 0.74 | 0.35 | 3.3 | 1.0 | 0.0 | 0.0 |
| Example 2 | 1 | 8.5 | 6.0 (Zirconia beads) | 0.05 | 3.9E-07 | 15 | 44 | 60 | 6.11E+06 | 30 | 8.1 | Vertical | 0.86 | 0.27 | 3.0 | 2.2 | 0.0 | 0.0 |
| Example 3 | 1 | 8.5 | 6.0 (Zirconia beads) | 0.05 | 3.9E-07 | 15 | 44 | 60 | 6.11E+06 | 60 | 16.2 | Vertical | 0.84 | 0.26 | 3.7 | 1.9 | 0.0 | −0.2 |
| Comparative Example 2 | 1 | 8.5 | 6.0 (Zirconia beads) | 0.05 | 3.9E-07 | 15 | 44 | 60 | 6.11E+06 | 120 | 32.4 | Vertical | 0.77 | 0.20 | 7.3 | 1.3 | −6.0 | −2.9 |
| Comparative Example 3 | 2 | 11.3 | 6.0 (Zirconia beads) | 0.05 | 3.9E-07 | 15 | 44 | 60 | 6.11E+06 | 3 | 0.8 | Vertical | 0.66 | 0.40 | 3.8 | 0.0 | 0.0 | 0.0 |
| Example 4 | 2 | 11.3 | 6.0 (Zirconia beads) | 0.05 | 3.9E-07 | 15 | 44 | 60 | 6.11E+06 | 10 | 2.7 | Vertical | 0.71 | 0.38 | 3.4 | 1.2 | 0.0 | 0.0 |
| Example 5 | 2 | 11.3 | 6.0 (Zirconia beads) | 0.05 | 3.9E-07 | 15 | 44 | 60 | 6.11E+06 | 60 | 16.2 | Vertical | 0.84 | 0.26 | 4.0 | 2.1 | −1.0 | −0.5 |
| Comparative Example 4 | 2 | 11.3 | 6.0 (Zirconia beads) | 0.05 | 3.9E-07 | 15 | 44 | 60 | 6.11E+06 | 120 | 32.4 | Vertical | 0.75 | 0.21 | 7.8 | 1.2 | −9.0 | −3.1 |
| Example 6 | 3 | 21.6 | 6.0 (Zirconia beads) | 0.05 | 3.9E-07 | 15 | 44 | 60 | 6.11E+06 | 10 | 2.7 | Vertical | 0.71 | 0.36 | 3.6 | 1.3 | 0.0 | 0.0 |
| Example 7 | 3 | 21.6 | 6.0 (Zirconia beads) | 0.05 | 3.9E-07 | 15 | 44 | 60 | 6.11E+06 | 60 | 16.2 | Vertical | 0.83 | 0.25 | 4.2 | 2.0 | −2.0 | −0.7 |
| Example 8 | 3 | 21.6 | 6.0 (Zirconia beads) | 0.05 | 3.9E-07 | 15 | 44 | 60 | 6.11E+06 | 10 | 2.7 | Longitudinal | 0.37 | 0.71 | 3.7 | 1.1 | 0.0 | 0.0 |
| Example 9 | 3 | 21.6 | 6.0 (Zirconia beads) | 0.05 | 3.9E-07 | 15 | 44 | 60 | 6.11E+06 | 60 | 16.2 | Longitudinal | 0.33 | 0.77 | 4.4 | 1.7 | −3.0 | −0.7 |
| Comparative Example 4 | 4 | 33.8 | 6.0 (Zirconia beads) | 0.05 | 3.9E-07 | 15 | 44 | 60 | 6.11E+06 | 10 | 2.7 | Vertical | 0.68 | 0.39 | 4.0 | 0.1 | 0.0 | 0.0 |
| Comparative Example 5 | 4 | 33.8 | 6.0 (Zirconia beads) | 0.05 | 3.9E-07 | 15 | 44 | 60 | 6.11E+06 | 60 | 16.2 | Vertical | 0.74 | 0.22 | 6.7 | 1.2 | −7.9 | −1.9 |
| Comparative Example 6 | 5 | 36.7 | 6.0 (Zirconia beads) | 0.05 | 3.9E-07 | 15 | 44 | 60 | 6.11E+06 | 10 | 2.7 | Vertical | 0.67 | 0.37 | 4.5 | 0.4 | −1.0 | −0.2 |
| Comparative Example 7 | 5 | 36.7 | 6.0 (Zirconia beads) | 0.05 | 3.9E-07 | 15 | 44 | 60 | 6.11E+06 | 60 | 16.2 | Vertical | 0.73 | 0.19 | 9.9 | Not measurable | Not measurable | Not measurable |
| Comparative Example 8 | 3 | 21.6 | 6.0 (Zirconia beads) | 0.5 | 3.9E-04 | 15 | 44179 | 60 | 6.11E+03 | 10 | 2.7 | Vertical | 0.73 | 0.26 | 5.8 | 1.0 | −7.0 | −1.3 |
| Comparative Example 9 | 3 | 21.6 | 6.0 (Zirconia beads) | 0.5 | 3.9E-04 | 10 | 19635 | 60 | 6.11E+03 | 10 | 1.2 | Vertical | 0.70 | 0.30 | 5.3 | 0.8 | −5.2 | −0.9 |
| Comparative Example 10 | 3 | 21.6 | 6.0 (Zirconia beads) | 0.5 | 3.9E-04 | 7 | 9621 | 60 | 6.11E+03 | 10 | 0.6 | Vertical | 0.66 | 0.39 | 4.8 | 0.2 | −2.6 | −0.6 |
| Example 10 | 3 | 21.6 | 6.0 (Zirconia beads) | 0.2 | 2.5E-05 | 15 | 2827 | 60 | 9.55E+04 | 60 | 16.2 | Vertical | 0.82 | 0.23 | 4.9 | 1.6 | −4.1 | −0.3 |
| Example 11 | 3 | 21.6 | 3.9 (Alumina beads) | 0.3 | 5.5E-05 | 7 | 1351 | 60 | 2.81E+04 | 60 | 2.3 | Vertical | 0.83 | 0.23 | 4.7 | 1.7 | −3.4 | −0.2 |
| Example 12 | 6 | 13.4 | 6.0 (Zirconia beads) | 0.05 | 3.9E-07 | 15 | 44 | 60 | 6.11E+06 | 60 | 16.2 | Vertical | 0.81 | 0.27 | 4.6 | 1.8 | −1.5 | −0.4 |
| Comparative Example 12 | 6 | 13.4 | 6.0 (Zirconia beads) | 0.05 | 3.9E-07 | 15 | 44 | 60 | 6.11E+06 | 120 | 32.4 | Vertical | 0.71 | 0.21 | 8.0 | 1.1 | −9.2 | −2.9 |

From the results shown in Table 3, it was confirmed that, in the magnetic tapes of Examples, excellent electromagnetic conversion characteristics and thermal stability were obtained and electromagnetic conversion characteristics during repeated running were hardly deteriorated.

The invention is effective in technical fields of magnetic tapes for data storage such as data back-up tapes.

What is claimed is:

1. A magnetic tape comprising:
a non-magnetic support; and
a magnetic layer including ferromagnetic powder and a binding agent on the non-magnetic support,
wherein the ferromagnetic powder is ferromagnetic hexagonal ferrite powder,
a vertical direction squareness ratio obtained without diamagnetic field correction by measurement performed by sweeping an external magnetic field in the magnetic tape at magnetic field strength of −1197 kA/m to 1197 kA/m by a vibrating sample magnetometer is 0.70 to 1.00, and
A calculated by Expression 1 is equal to or smaller than 5.0%;

$$A = 100 \times \sqrt{\frac{1}{n-1} \sum_{Hex=-40kA/m \sim 40kA/m} (Mr(Hex) - \mu)^2} \Big/ \mu \quad \text{Expression 1}$$

in Expression 1, n represents the number of measurement points measured at magnetic field strength of −40 kA/m to 40 kA/m during the sweeping and is 52, Mr(Hex) represents a magnetization quantity measured at magnetic field strength Hex, and μ represents an arithmetical mean of Mr(Hex) obtained by measurement performed at magnetic field strength of −40 kA/m to 40 kA/m during the sweeping.

2. The magnetic tape according to claim 1, wherein the A is 1.5% to 5.0%.

3. The magnetic tape according to claim 1, wherein the A is 1.5% to 3.9%.

4. The magnetic tape according to claim 1, wherein the vertical direction squareness ratio obtained by the measurement is 0.75 to 1.00.

5. The magnetic tape according to claim 2, wherein the vertical direction squareness ratio obtained by the measurement is 0.75 to 1.00.

6. The magnetic tape according to claim 3, wherein the vertical direction squareness ratio obtained by the measurement is 0.75 to 1.00.

7. The magnetic tape according to claim 1, further comprising:
a non-magnetic layer, including non-magnetic powder and a binding agent, between the non-magnetic support and the magnetic layer.

8. The magnetic tape according to claim 1, further comprising:
a back coating layer, including non-magnetic powder and a binding agent, on a surface side of the non-magnetic support opposite to a surface side provided with the magnetic layer.

* * * * *